F. LE ROY AND N. W. WHITBECK.
VALVE HANDLE.
APPLICATION FILED JAN. 19, 1918.

1,323,195.

Patented Nov. 25, 1919.

Inventors
Frank LeRoy
Neal W. Whitbeck

By Whittemore Hulbert + Whittemore
Attorneys

UNITED STATES PATENT OFFICE.

FRANK LE ROY AND NEAL W. WHITBECK, OF DETROIT, MICHIGAN, ASSIGNORS TO MICHIGAN LUBRICATOR COMPANY, OF DETROIT, MICHIGAN, A CORPORATION OF MICHIGAN.

VALVE-HANDLE.

1,323,195.   Specification of Letters Patent.   Patented Nov. 25, 1919.

Application filed January 19, 1918. Serial No. 212,802.

*To all whom it may concern:*

Be it known that we, FRANK LE ROY and NEAL W. WHITBECK, citizens of the United States of America, residing at Detroit, in the county of Wayne and State of Michigan, have invented certain new and useful Improvements in Valve-Handles, of which the following is a specification, reference being had therein to the accompanying drawings.

The invention relates to a valve handle construction and more particularly relates to means for fastening the handle of a valve non-rotatably upon its stem.

It is the object of the invention to reduce the cost of manufacture by providing for a comparatively rapid assembly of the handle upon its stem; by avoiding necessity for squaring the end of the stem as in common practice and by providing a follower for the handle that may be inexpensively stamped from sheet-metal.

Figure 1:
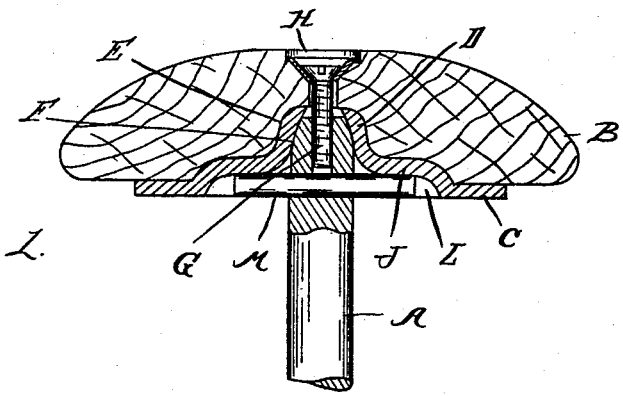
Figure 1 is an axial sectional view of the handle and stem in assembled relation.
Figure 2:
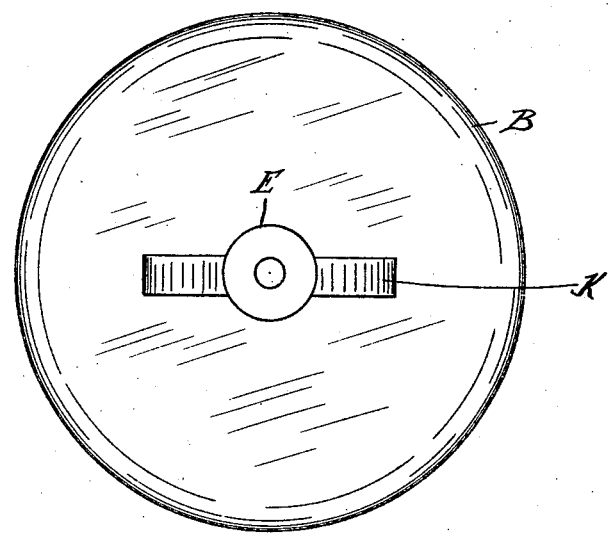
Fig. 2 is a bottom view of the handle.
Figure 3:
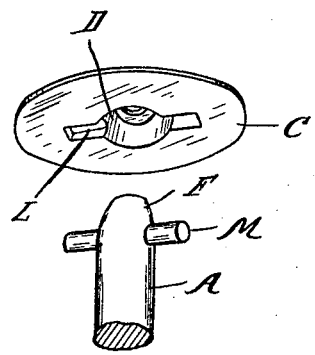
Fig. 3 is a detail perspective view showing the stem and the follower for the handle disassembled.

In said views the reference character A designates a valve stem, B the handle thereof and C a disk-shaped sheet-metal stamping forming a follower for the handle, the center portion thereof having the form of a tapered collar D insertible in a central recess E in the under surface of the handle. The valve stem has an extremity tapered to conform to the collar D as indicated at F, said extremity being inserted in said collar and engaged by a screw G passing centrally through the handle, the head thereof being countersunk as shown at H. At opposite sides of the collar D said follower is formed with ribs J which are adapted to fit into corresponding recesses K formed in the handle in communication with the recess E. In producing the ribs J in the follower at one side thereof, recesses L are formed in said member at its other side, which recesses are adapted to receive the end portions of a pin M transversely mounted in the stem A adjacent its tapering extremity. When said pin is engaged in said recesses and the screw G is tightened rotation of the follower with relation to the stem is prevented by said pin and the latter is restrained against displacement from the stem by the walls of said recesses. Rotation of the follower with relation to the handle is also prevented by engagement of the ribs J in the recesses K of the handle.

It is evident that the member C may be produced at low cost, since the collar D and ribs J may be produced therein by a single stamping operation. By tapering the end of the stem, engagement of the follower therewith during assembly is facilitated and a firm seat for the follower upon the stem is assured, while at the same time displacement of the follower and handle downward upon the stem is prevented. Necessity for fastening the pin M rigidly in the stem is avoided by positioning said pin within a recess of the follower whereby accidental removal of the pin from the stem is prevented.

What we claim as our invention is:—

1. A valve handle construction, comprising a stem, a handle therefor having a depression in its under face, means preventing removal of the handle from the stem, a sheet metal stamping forming a follower for the handle and bearing against the under surface thereof, said stamping having a raised portion engaging said depression of the handle and having a corresponding depression in its under face, and a member detachably carried by the stem and engageable in said depression of the follower through a longitudinal relative movement of the stem and follower.

2. A valve handle construction comprising a stem, a handle therefor having a depression in its under face, means preventing removal of the handle from the stem, a sheet-metal stamping forming a follower for the handle and bearing against the under surface thereof, said stamping having a raised portion engaging said depression of the handle and having a corresponding depression in its under face, and a member carried by the stem and engaged in said depression of the follower through a longitudinal movement of the stem and follower.

In testimony whereof we affix our signatures.

FRANK LE ROY.
NEAL W. WHITBECK.